(12) United States Patent
Parkin

(10) Patent No.: US 6,591,449 B1
(45) Date of Patent: Jul. 15, 2003

(54) CASTER ASSEMBLIES

(75) Inventor: John R. Parkin, Christchurch (GB)

(73) Assignee: APW Ltd., Waukesha, WI (US)

( * ) Notice: Subject to any disclaimer, the term of this patent is extended or adjusted under 35 U.S.C. 154(b) by 0 days.

(21) Appl. No.: 09/958,171

(22) PCT Filed: Apr. 10, 2000

(86) PCT No.: PCT/GB00/01304

§ 371 (c)(1),
(2), (4) Date: Mar. 22, 2002

(87) PCT Pub. No.: WO00/61389

PCT Pub. Date: Oct. 19, 2000

(30) Foreign Application Priority Data

Apr. 10, 1999 (GB) .............................................. 9908147

(51) Int. Cl.$^7$ .............................................. B60B 33/00
(52) U.S. Cl. .............................. 16/35 R; 16/32; 16/44; 16/19
(58) Field of Search .......................... 16/35 R, 32, 44, 16/33, 34, 19; 182/12, 15, 16

(56) References Cited

U.S. PATENT DOCUMENTS

| | | | | |
|---|---|---|---|---|
| 1,017,464 A | * | 2/1912 | Rae ................................ | 16/32 |
| 2,828,578 A | | 4/1958 | McCabe | |
| 3,545,707 A | | 12/1970 | Orii | |
| 3,602,464 A | | 8/1971 | Orii | |
| 4,166,516 A | * | 9/1979 | Thurmond, Jr. ................. | 16/19 |
| 4,339,842 A | | 7/1982 | Fontana et al. | |
| 4,364,148 A | | 12/1982 | McVicker | |
| 4,969,232 A | * | 11/1990 | Michel ......................... | 16/350 |
| 5,042,110 A | | 8/1991 | Orii | |
| 5,457,849 A | * | 10/1995 | Branson et al. ................. | 16/19 |
| 6,055,704 A | * | 5/2000 | Leibman ........................ | 16/32 |

FOREIGN PATENT DOCUMENTS

| | | | |
|---|---|---|---|
| CH | 670-991 A5 | | 7/1989 |
| DE | 594867 | | 3/1934 |
| DE | 4321739 A1 | | 1/1995 |
| EP | 99300078.5 | | 1/1999 |
| EP | 0 931 675 A1 | | 7/1999 |
| FR | 1.128.140 A | | 1/1957 |
| GB | 1036254 | | 7/1966 |
| GB | 2 176 699 A | | 1/1987 |
| GB | 2 243 773 | | 11/1991 |
| GB | 2333445 A | * | 7/1999 |
| JP | 62-214003 A | | 9/1987 |
| JP | 5-116502 A | | 5/1993 |
| JP | 02000343904 A | * | 12/2000 |

OTHER PUBLICATIONS

PCT International Search Report for Int'l Appl. No. PCT/GB00/01304, dated Jul. 13, 2000.
Anonymous: "Combination Caster and Jack"; IBM Technical Disclosure Bulletin, US, IBM Corp. New York, vol. 26, No. 4, Sep. 1983); pp. 1884–1886, Figs. 1–3.
Keystone, Footmaster Castors KGD Series (Light & Medium duty), technical document.

* cited by examiner

Primary Examiner—Chuck Y. Mah
(74) Attorney, Agent, or Firm—Quarles & Brady LLP

(57) ABSTRACT

A castor assembly comprises stem (2) which is adapted at the upper end (4) thereof to be connected to the base of a structure to be supported, a foot (5), a castor body (3) swivellably mounted on the stem (2), a castor wheel (12) carried by the castor body, the rotational axis (13) of the castor wheel being offset from the axis of the stem to provide castoring, and a thrust bearing (19) positioned at the upper end of the castor body. The foot (5) is carried by the lower end of the stem (2), which is adjustable threadedly engageable with a threaded bore in the base whereby adjustment of the stem upper end (4) causes the foot to be raised or lowered relative to the base. The castor body (3) is capable of vertical movement relative to the stem (2), and the thrust bearing (20) bears the vertical load acting between the castor body and the base when the foot (5) is lifted clear of the floor and the castor wheel is supporting the structure.

8 Claims, 3 Drawing Sheets

CASTER ASSEMBLIES

Figure 1:
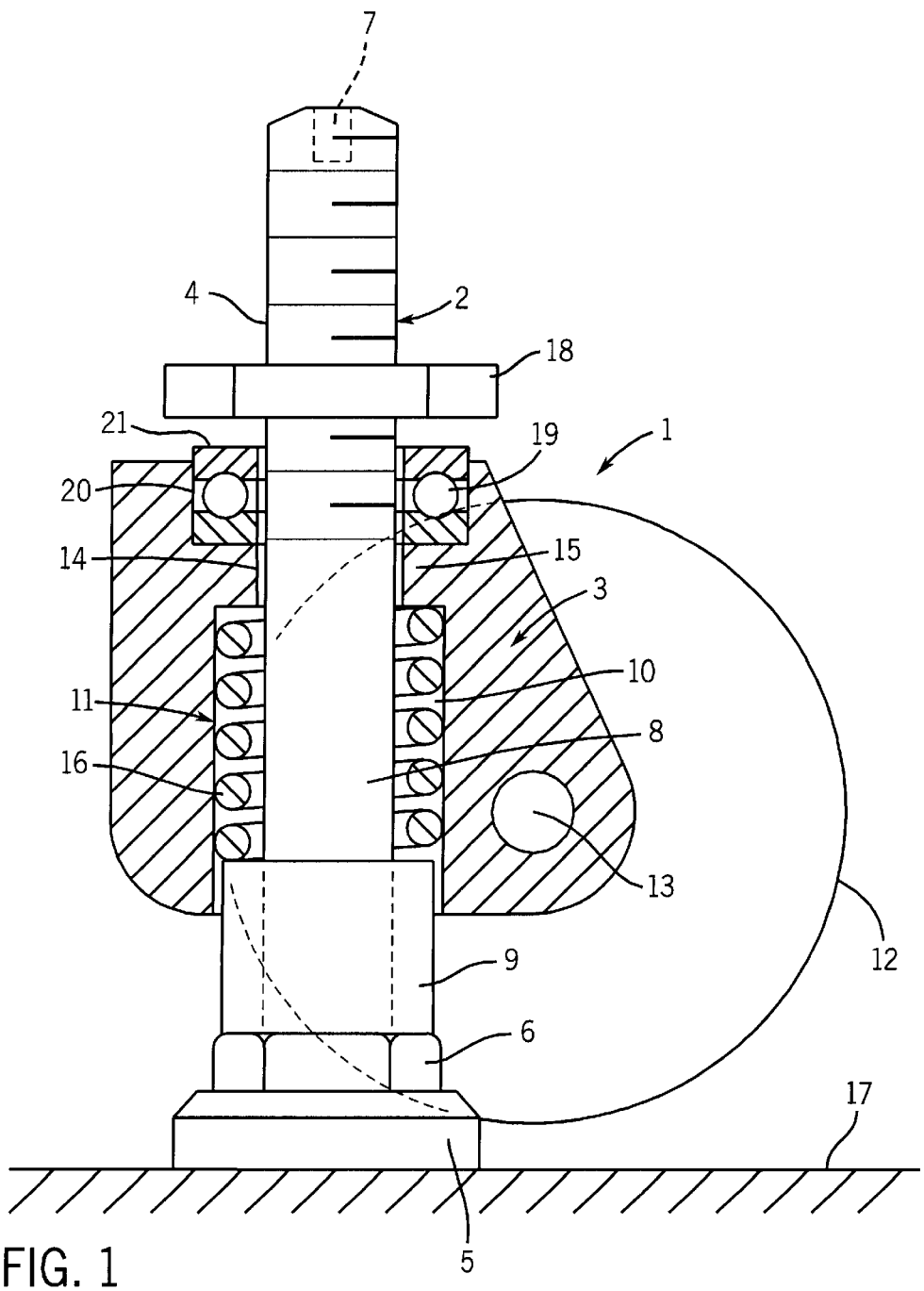

This invention relates to castor assemblies and to housings fitted with castor assemblies, particularly, but not exclusively, housings used to house electronic equipment.

Castors are often fitted to housings to enable them to be wheeled into a position of use where they may be jacked off the castors and supported on feet, some or all of which can be made adjustable for levelling of the housing and/or to provide the jacking facility.

In our European patent application no. EP 99300078.5 dated Jan. 6, 1999, we have described a support means for a housing comprising, a each of a plurality of positions, a wheel and a foot provided together on a single mounting. The exemplary castor assembly comprises a castor body which is pivotable about the axis of a castor pin the projecting upper end of which is adapted to be received in a vertical bore in the underside of a housing base, and the castor body is provided with a threaded vertical bore, spaced horizontally from the castor pin axis and on the opposite side of the castor pin axis from the rotational axis of the castor wheels carried by the body, a foot spindle being threadedly engaged with said threaded vertical bore and carrying a ground-engageable foot. On lowering of the foot by rotation of the foot spindle, the associated castor wheels can be jacked clear of the ground.

Whilst the foregoing exemplary castor assembly provides a relatively cost-effective castor assembly with integral jacking foot, we now consider that it would be advantageous to try to arrange the vertical axis of the foot to coincide substantially with the vertical axis of the castor pivot, in order to reduce the risk of the housing slewing sideways under the influence of a lateral force when the wheels are jacked clear of the ground.

However it is also desirable that the cost of the castor assembly be kept to a minimum since once the housing has been brought to its position of use, the castor wheels may not often be utilised again and, in effect, the provision of castor assemblies adds to the overall cost of the housing.

There is therefore a need for a castor assembly which incorporates a height adjustable jacking foot acting substantially on the pivotal axis of the castor assembly, but which is of inexpensive construction yet can be made relatively sturdy.

According to one aspect of the present invention we provide a castor assembly comprising a stem which is adapted at the upper end thereof to be connected to the base of a structure to be supported, a foot, a castor body swivellably mounted on the stem, a castor wheel carried by the castor body, the rotational axis of the castor wheel being offset from the axis of the stem to provide castoring, and a thrust bearing positioned at the upper end of the castor body, characterised in that the foot is carried by the lower end of the stem, the stem is adapted to be adjustably threadedly engaged with a threaded bore in said base whereby adjustment of the stem upper end causes the foot to be raised or lowered relative to the base, the castor body is arranged to be capable of vertical movement relative to the stem, and the thrust bearing is arranged to bear the vertical load acting between the castor body and the base when the foot is lifted clear of the floor and the castor wheel is supporting the structure.

Thus the foot is capable of being lowered or raised by screwing of the stem relative to the base. When the foot is lowered sufficiently relative the base the foot will support the load, but when the foot is raised sufficiently, the castor wheel Will then support the load.

It will be appreciated that the stem performs several functions:
i. It provides the means of attachment of the castor assembly to the base,
ii. it provides the means of adjustably supporting the foot whereby the foot can be raised and lowered relative to the base of the supported structure, and
iii. it acts to locate the swivellable castor body.

The various functions performed by the stem enable the overall cost of the castor assembly to be reduced.

A resilient means is preferably provided to bias the castor body upwards relative to the stem, thereby lifting the castor wheel clear of the floor when the foot is lowered sufficiently relative to the base.

A lock nut is preferably provided on the threaded upper part of the stem for locking engagement with the base of the structure, in order to lock the stem relative to the base when the required vertical adjustment of the stem has been achieved (usually when the housing has been fully supported by a plurality of the feet and has been brought to a horizontal attitude).

When a lock nut is provided then the thrust bearing can bear against the underside of the lock nut.

In order to resist tilting of the castor body about the vertical axis of the stem when the castor wheel is operative to support the load, the stem preferably carries adjacent to the foot a lateral bush which is located in a bore in the castor body.

Said castor body bore preferably houses a coiled compression spring which constitutes said resilient means.

The thrust bearing may simply be provided by a suitably hard upper surface of the castor body, but preferably the thrust bearing is a separate bearing assembly which may be a ball or needle-roller bearing assembly, but can be a plain bush.

In order to provide the necessary vertical adjustment of the stem relative to the base it will usually be necessary for the lower threads of the stem upper end to pass through the thrust bearing, and in order to avoid the possibility of the threads damaging the bearing, it may be desirable to provide a sleeve within the upper part of the castor body, to extend through the centre of the bearing.

When the thrust bearing is in the form of a plain bearing, the plain bearing can be dimensioned to act also as an upper lateral bush. Alternatively, when the thrust bearing is a ball or needle-roller bearing, an additional upper lateral bush may be provided adjacent to the thrust bearing in order to resist tilting of the castor body relative to the stem.

The invention, according to a second aspect thereof, comprises a housing comprising a housing base provided at each of a plurality of positions with castor assemblies in accordance with the first aspect of the invention.

Figure 2:
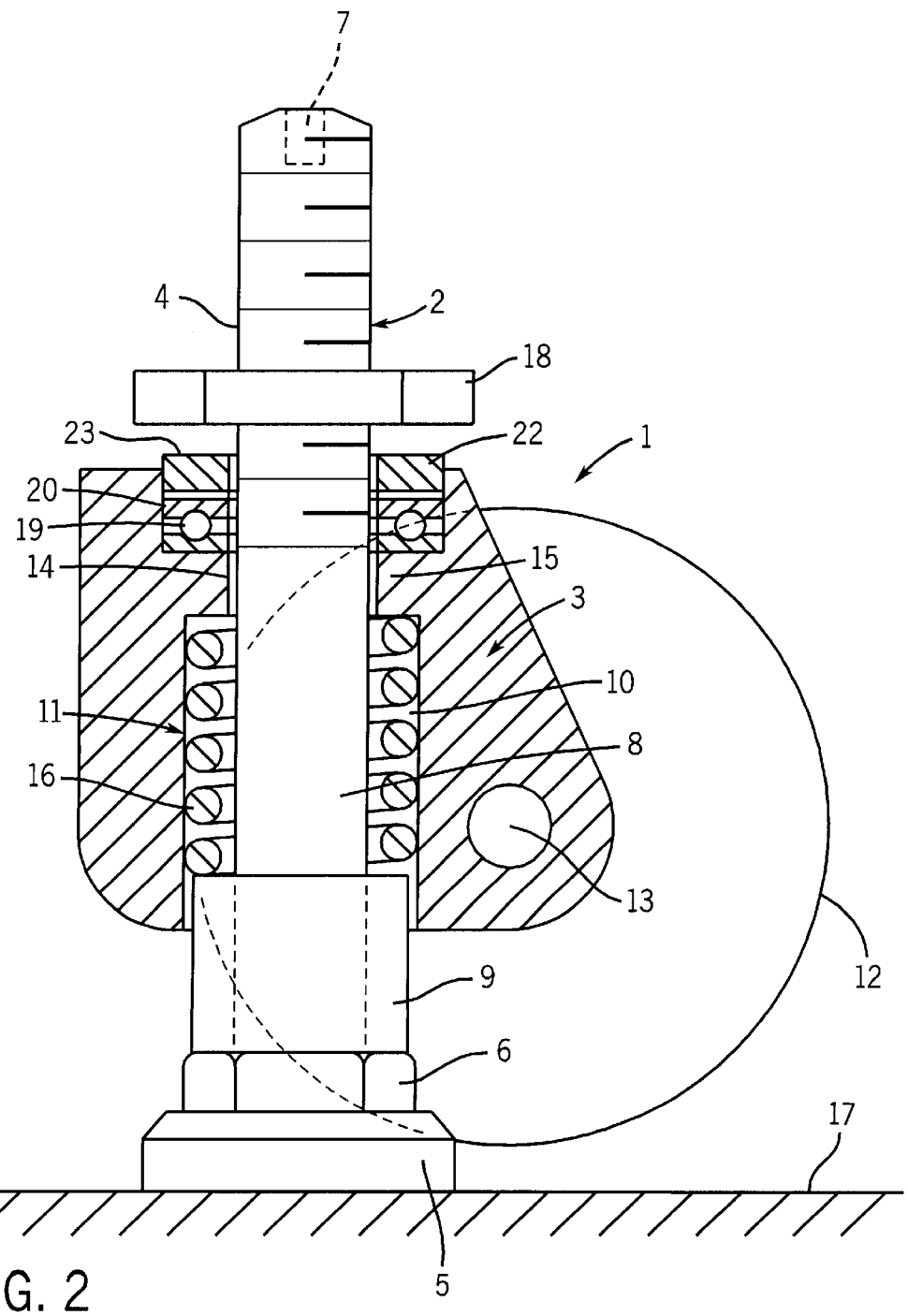
Figure 3:
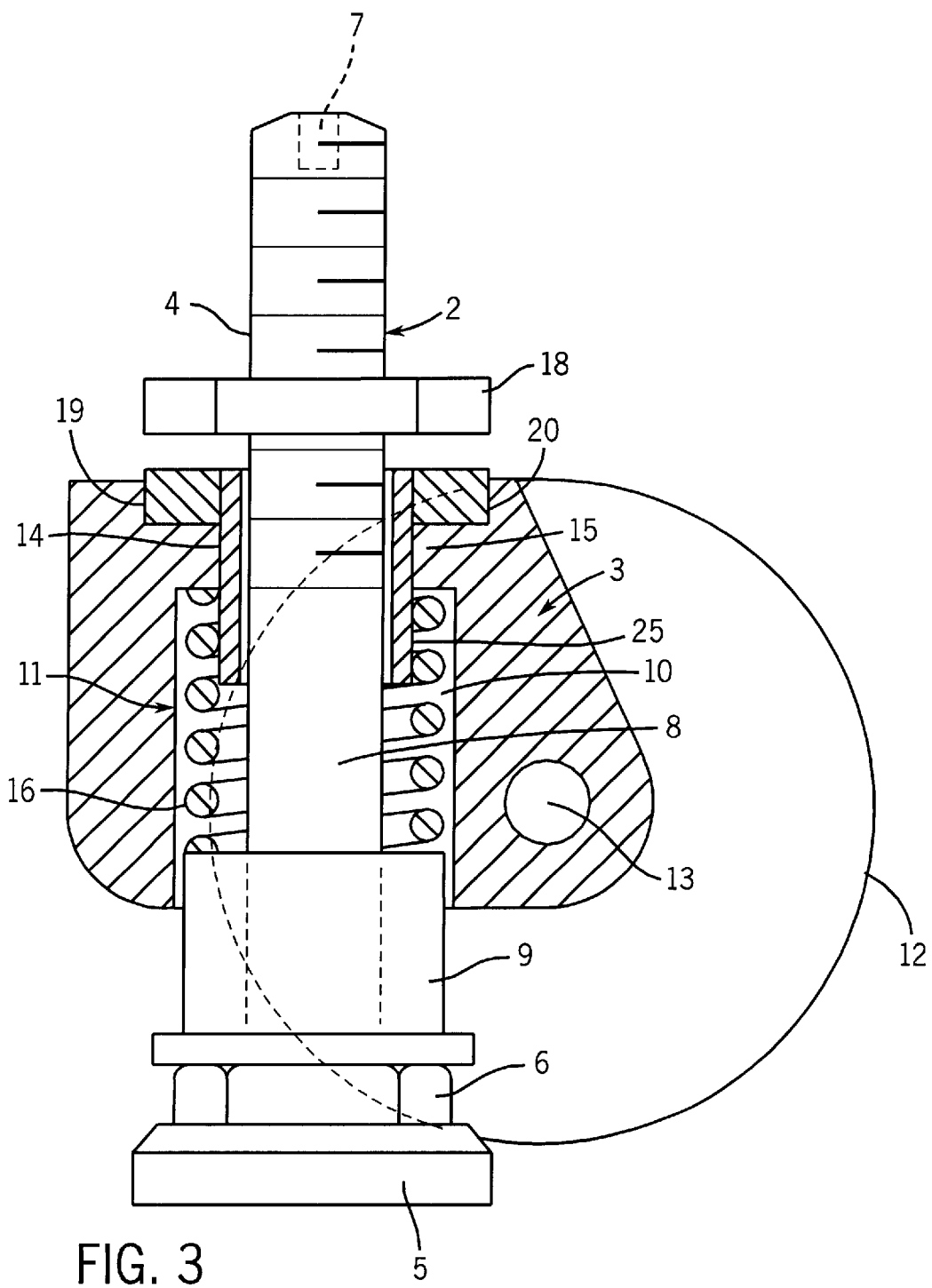

Some embodiments of the invention will now be described, by way of example only, with reference to the accompanying drawings, in which:

FIG. 1 is a vertical cross-section of a first castor assembly in accordance with the invention, and shown with the foot lowered to raise the castor wheels clear of the floor, FIG. 2 is a cross-section similar to FIG. 1 of a second castor assembly in accordance with the invention, and FIG. 3 is a cross-section similar to FIG. 1 of a third castor assembly in accordance with the invention.

In FIG. 1 is shown a castor assembly 1 comprising a stem 2 on which is swivellably carried a castor body 3, the upper end portion 4 of the stem being externally threaded for threadedly adjustably engaging with a threaded through-hole in the base of a housing to be supported. The lower end of stem 2 is formed to carry a foot 5 with an integral hexagonal form 6 adjacent thereto, which provides one means of turning the stem when the height of the foot relative to the housing base is to be adjusted.

A pair of wheels 12 is carried by an axle 13 which is offset from the vertical axis of stem 2, the wheels being positioned on either side of the body 3.

A hexagonal recess 7 is provided in the upper extremity of stem 2 to enable the stem to be turned from inside the housing when the upper end of the stem is accessible.

The shank 8 of the stem 2 is of substantially constant cross-section and mounts a lower, lateral bush 9 of tubular form. The upper end of bush 9 is located in bore 11. That is, the bush 9 is a close sliding fit in the enlarged lower bore portion 10 of the vertical bore 11 of castor body 3, and thereby provides lateral guidance to the lower region of the castor body 3, so as to help resist tilting of the castor body 3 relative to the stem 2 when castor wheels 12 are operative to support the housing.

Alternatively, the stem 2, the bush 9 and the hexagon form 6 could be formed as a single component, for example by machining or cold forming.

The bore 11 of castor body 3 comprises a reduced diameter portion 14 defined by a radially inwardly-directed annular shoulder 15. The lower face of shoulder 15 provides an abutment for the upper end of a coiled compression spring 16 housed in lower bore portion 10 around shank 8, and bearing at its lower end on the upper end of lower lateral bush 9.

Spring 16 constitutes a resilient means biasing the castor body 3 upwards relative to stem 2 and will lift the wheels 12 clear of the floor 17, as shown in FIG. 1, when the stem 2 is sufficiently screwed down from the base, not shown.

A lock nut 18 is threadedly carried by the upper part 4 of the stem and is capable of locking the stem 2 to the base of the housing.

A thrust bearing 19 is in the form of a ball-bearing assembly in this embodiment, the thrust bearing 19 being housed substantially in an enlarged upper bore portion, 20 of body bore 11, the enlarged bore portion 20 lying above annular shoulder 15.

In use, when lock nut 18 is fast against the underside of the base of the housing, the upper face 21 of bearing 19, which protrudes from the top of body 3, will engage with the lower face of lock nut 18, to support the vertical load carried by the wheel when the foot 5 is raised clear of the floor.

Lock nut 18 also holds captive the various components on stem 2 prior to mounting of the castor assembly to a housing.

In FIGS. 2 and 3, parts corresponding to those of the assembly of FIG. 1 have been given corresponding reference numbers.

Referring to FIG. 2, this embodiment differs from that of FIG. 1 in that an upper lateral thrust bush 22 is provided, the bush 22 being positioned in bore portion 20 above ball-bearing assembly 19. Bush 22 helps to prevent tilting of the castor body 3 relative to stem 2. It will be appreciated that the upper surface 23 of bush 22 will engage in use with the underside of lock nut 18, thereby to bear the vertical load acting between castor body 3 and the housing base when the castor wheels 12 are supporting the housing.

It will be seen in FIGS. 1 and 2 that the threads on the stem portion 4 enter the bore of bearing 19 when the foot is screwed down sufficiently, as shown, to allow spring 16 to raise the wheels clear of the floor 17. In circumstances where the castor wheels are to be used and then disabled on a relatively frequent basis, then this could be a disadvantage, and the embodiment of FIG. 3 is directed principally at overcoming this perceived problem.

In the third embodiment of FIG. 3, a rigid sleeve 25 is a tight fit with annular shoulder 15, and extends vertically through bearing 19 which is shown in the form of an upper thrust washer which also acts as an upper bush to resist transverse loads. Sleeve 25 avoids damage to bearing 19 by the threads on stem portion 4.

It will be appreciated that in the embodiment of FIG. 3, the upper thrust washer 19 could be replaced by a ball-bearing assembly as in FIG. 1, or by the combination of a ball-bearing assembly and a lateral thrust bush as in FIG. 2.

What is claimed is:

1. A castor assembly comprises stem (2) which is adapted at the upper end (4) thereof to be connected to the base of a structure to be supported, a foot (5), a castor body (3) swivellably mounted on the stem (2), a castor wheel (12) carried by the castor body, the rotational axis (13) of the castor wheel being offset from the axis of the stem to provide castoring and a thrust bearing (19) positioned at the upper end of the castor body, characterized in that the foot (5) is carried by the lower end of the stem (2), the stem is adapted to be adjustably threadedly engaged with a threaded bore in said base of said structure to be supported whereby adjustment of the stem upper end (4) causes the foot to be raised or lowered relative to the base, the castor body (3) is arranged to be capable of vertical sliding movement relative to the stem (2), and the thrust bearing (20) is arranged to bear the vertical load acting between the castor body and the base when the foot (5) is lifted clear of the floor and the castor wheel is supporting the structure.

2. An assembly as claimed in claim 1 in which a resilient means is arranged to bias the castor body upwards relative to the stem, thereby lifting the castor wheel clear of the floor when the foot is lowered sufficiently relative to the base.

3. An assembly as claimed in claim 2 in which the stem carries adjacent to the foot a lateral bush (9) which is located in a bore (10) in the castor body and in which said castor body bore (1) houses a coiled compression spring (16) which constitutes said resilient means.

4. An assembly as claimed in claim 1 comprising a lock nut on the threaded upper part of the stem for locking engagement with the base of the structure.

5. An assembly as claimed in claim 4 in which the thrust bearing bears against the underside of the lock nut.

6. An assembly as claimed in claim 1 in which the stem carries adjacent to the foot a lateral bush which is located in a bore in the castor body.

7. An assembly as claimed in claim 1 in which the thrust bearing is a plain bush which acts as an upper lateral bush to resist tilting of the castor body relative to the stem.

8. A housing comprising a housing base provided at each of a plurality of positions with castor assemblies in accordance with claim 1.

* * * * *

UNITED STATES PATENT AND TRADEMARK OFFICE
CERTIFICATE OF CORRECTION

PATENT NO. : 6,591,449 B1  Page 1 of 1
DATED : July 15, 2003
INVENTOR(S) : John R. Parkin It is certified that error appears in the above-identified patent and that said Letters Patent is hereby corrected as shown below:

Column 1,
Line 13, "a each" should be -- at each --.
Line 65, "relative the" should be -- relative to the --.
Line 67, "Will" should have lower case "w" therefore reading -- will then --.

Column 3,
Line 39, delete comma "," from "portion, 20".

Column 4,
Line 25, insert comma -- , -- "cstoring and" should be -- castoring, and --.

Signed and Sealed this

Sixth Day of January, 2004

JAMES E. ROGAN
*Director of the United States Patent and Trademark Office*